US011522257B2

(12) United States Patent
Ko et al.

(10) Patent No.: US 11,522,257 B2
(45) Date of Patent: Dec. 6, 2022

(54) BUTTON CELL

(71) Applicant: SAMSUNG SDI CO., LTD., Yongin-si (KR)

(72) Inventors: Heejung Ko, Yongin-si (KR); Kijung Kim, Yongin-si (KR); Yongjin Park, Yongin-si (KR); Byongchul Woo, Yongin-si (KR); Jong-Ha Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/178,555

(22) Filed: Feb. 18, 2021

(65) Prior Publication Data

US 2021/0408648 A1   Dec. 30, 2021

(30) Foreign Application Priority Data

Jun. 26, 2020  (KR) .......................... 10-2020-0078576

(51) Int. Cl.
*H01M 50/547* (2021.01)
*H01M 50/533* (2021.01)
*H01M 50/562* (2021.01)

(52) U.S. Cl.
CPC ....... *H01M 50/547* (2021.01); *H01M 50/533* (2021.01); *H01M 50/562* (2021.01)

(58) Field of Classification Search
CPC ............. H01M 50/543; H01M 50/109; H01M 10/0427; H01M 50/559; H01M 50/153;

(Continued)

(56) References Cited

U.S. PATENT DOCUMENTS

2004/0023108 A1   2/2004  Nakanishi et al.
2016/0118641 A1*  4/2016  Oda ..................... H01M 50/543
                                                                429/211

FOREIGN PATENT DOCUMENTS

CN   201956410 U  *  8/2011  ............. Y02E 60/10
CN   204596910 U      8/2015
CN   210379128 U      4/2020

OTHER PUBLICATIONS

Machine translation of CN-201956410-U (Year: 2011).*

(Continued)

*Primary Examiner* — William E McClain
*Assistant Examiner* — Jason Barton
(74) *Attorney, Agent, or Firm* — Lewis Roca Rothgerber Christie LLP

(57) ABSTRACT

A rechargeable battery includes: an electrode assembly including a first electrode, a second electrode, and a separator between the first electrode and the second electrode; a case connected to the first electrode and accommodating the electrode assembly, the case including an opening to receive the electrode assembly; a cap plate bonded to the case to cover an outer region of the opening and including a through-hole to expose a center region of the opening; a terminal plate bonded to and insulated from the cap plate, covering the through-hole, and connected to the second electrode; and a terminal plating layer coated on an upper surface of the terminal plate, and a thickness of a center portion of the terminal plating layer overlapping the through-hole is thicker than a thickness of an outer portion of the terminal plating layer overlapping the upper surface of the terminal plate.

12 Claims, 3 Drawing Sheets

(58) Field of Classification Search
CPC .. H01M 50/533; H01M 50/547; H01M 50/55; H01M 50/548; H01M 50/552; H01M 50/553; H01M 50/562; H01M 50/564; H01M 50/566; H01M 50/567; H01M 50/569; H01M 50/296; Y02E 60/10; Y02P 70/50; Y02T 10/70
See application file for complete search history.

(56) References Cited

OTHER PUBLICATIONS

Extended European Search Report issued in corresponding Application No. 21176340.4, dated Nov. 23, 2021, 5 pages.
EP Office action dated Oct. 6, 2022 issued in corresponding European Patent Application No. 21176340.4, 3 pages.

* cited by examiner

BUTTON CELL

CROSS-REFERENCE TO RELATED APPLICATION

This application claims priority to and the benefit of Korean Patent Application No. 10-2020-0078576, filed on Jun. 26, 2020 in the Korean Intellectual Property Office, the entire content of which is incorporated herein by reference.

BACKGROUND

1. Field

Aspects of embodiments of the present disclosure relate to a rechargeable battery.

2. Description of the Related Art

Generally, a rechargeable battery is a battery that can be repeatedly charged and discharged.

In recent years, as a demand for wearable devices, such as headphones, earphones, smartwatches, and body-attached medical devices using wireless communication such as Bluetooth increases, a need for ultra-small rechargeable batteries installed in the wearable devices is increasing.

An electrode terminal disposed on an outer surface of the ultra-small rechargeable battery is in contact with a contact terminal of the wearable device to supply power to the wearable device.

However, since an oxide film may be naturally formed on the surface of the electrode terminal of the ultra-small rechargeable battery, there is a problem that contact resistance between the electrode terminal of the ultra-small rechargeable battery and the contact terminal of the wearable device is increased.

The above information disclosed in this Background section is only for enhancement of understanding of the background of the invention, and, therefore, it may contain information that does not form the prior art that is already known in this country to a person of ordinary skill in the art.

SUMMARY

According to an aspect of one or more embodiments, a rechargeable battery is provided in which the formation of an oxide layer on a surface of the electrode terminal of the rechargeable battery is suppressed, and an increase of the contact resistance between the electrode terminal of the rechargeable battery and the contact terminal of the device is suppressed.

A rechargeable battery according to one or more embodiments of the present invention includes: an electrode assembly including a first electrode, a second electrode, and a separator between the first electrode and the second electrode; a case connected to the first electrode and accommodating the electrode assembly, the case including an opening to receive the electrode assembly; a cap plate bonded to the case to cover an outer region of the opening and including a through-hole to expose a center region of the opening; a terminal plate bonded to and insulated from the cap plate, covering the through-hole, and connected to the second electrode; and a terminal plating layer coated on an upper surface of the terminal plate, and a thickness of a center portion of the terminal plating layer overlapping the through-hole is thicker than a thickness of an outer portion of the terminal plating layer overlapping the upper surface of the terminal plate.

A surface roughness of the center portion of the terminal plating layer may be less than a surface roughness of the outer portion of the terminal plating layer.

The terminal plating layer may have a ductility less than that of the terminal plate.

The center portion of the terminal plating layer may be protruded in an upper direction from the outer portion of the terminal plating layer.

The terminal plate may include aluminum, and the terminal plating layer may include nickel.

The case and the cap plate may include stainless steel.

The terminal plate may include: a terminal part on the cap plate; and a protruded part penetrating through the through-hole from the terminal part to be connected to the second electrode.

The terminal plating layer may be on an upper surface of the terminal part.

The center portion of the terminal plating layer may be protruded in an opposite direction to the protruded part.

The case and the cap plate may have a same polarity as the first electrode, and the terminal plate and the terminal plating layer may have a same polarity as the second electrode.

The rechargeable battery may further include a thermal-fusion layer between the cap plate and the terminal plate to insulate and bond the cap plate and the terminal plate.

The electrode assembly may further include: a first electrode tab extending from the first electrode to be bonded to the case; and a second electrode tab extending from the second electrode to be bonded to the terminal plate.

According to an aspect of one or more embodiments, a rechargeable battery is provided in which the formation of an oxide layer on the surface of the electrode terminal of the rechargeable battery is suppressed, and an increase of the contact resistance between the electrode terminal of the rechargeable battery and the contact terminal of a device is suppressed.

Figure 1:
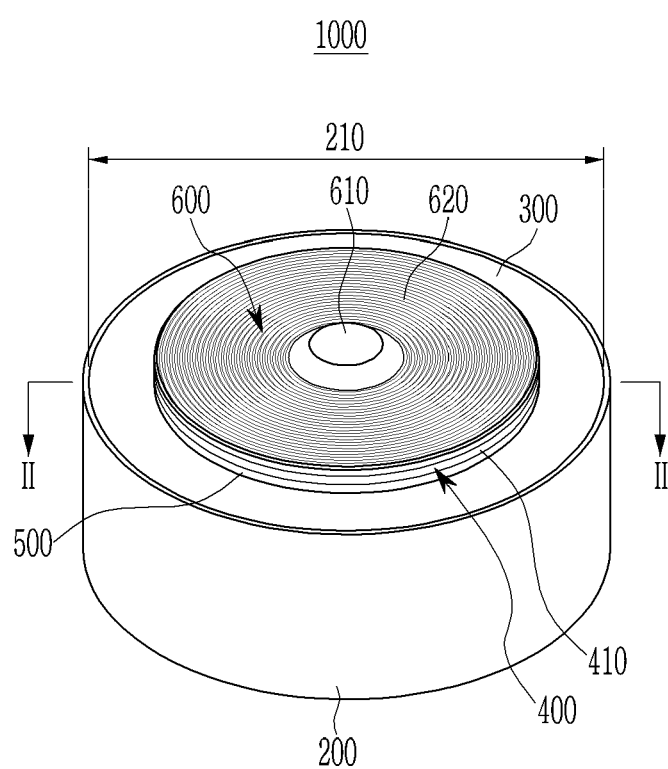
FIG. 1 is a perspective view showing a rechargeable battery according to an embodiment.

| DESCRIPTION OF REFERENCE DESIGNATORS | |
|---|---|
| 100: electrode assembly | 200: case |
| 300: cap plate | 400: terminal plate |
| 500: thermal-fusion layer | 600: terminal plating layer |
| 610: center portion | 620: outer portion |

DETAILED DESCRIPTION

The present invention will be described more fully herein with reference to the accompanying drawings, in which some example embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

In addition, unless explicitly described to the contrary, it is to be understood that terms such as "comprises," "includes," or "have" used in the present specification specify the presence of stated features, numerals, steps, operations, components, parts, or a combination thereof, but do not preclude the presence or addition of one or more other features, numerals, steps, operations, components, parts, or a combination thereof.

Also, in this specification, it is to be understood that when one component is referred to as being "connected" or "coupled" to another component, it may be connected or coupled directly to the other component or connected or coupled to another component with one or more other components intervening therebetween.

Singular forms are to include plural forms unless the context clearly indicates otherwise.

It is to be understood that, although the terms "first," "second," etc. may be used herein to describe various elements, these elements should not be limited by these terms. These terms are used to distinguish one element from another. For example, a first element could be termed a "second" element, and, similarly, a second element could be termed a "first" element, without departing from the scope of example embodiments of the inventive concept. The terms of a singular form may include plural forms unless the context clearly indicates otherwise.

In addition, terms such as "below," "lower," "above," "upper," and the like are used to describe the relationship of the configurations shown in the drawings. However, the terms are used as a relative concept and are described with reference to the direction indicated in the drawings.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

Next, a rechargeable battery according to an embodiment is described with reference to FIG. 1 to FIG. 3.

The rechargeable battery according to an embodiment is an ultra-small rechargeable battery and may be a coin-type cell or a button-type cell, but is not limited thereto, and may be a cylindrical or pin-type cell.

Here, the coin-type cell or the button-type cell is a thin coin-type or button-shape cell and may refer to a cell having a ratio of a height to a diameter of 1 or less, however, it is not limited thereto. The coin cell or the button cell may be cylindrical, and a horizontal cross-section may be circular, but the present invention is not limited thereto, and a horizontal cross-section may be oval or polygonal. In this case, the diameter may refer to the maximum distance based on the horizontal direction of the battery, and the height may refer to the maximum distance (a distance from a flat bottom surface to a flat uppermost surface) based on the vertical direction of the battery.

Figure 2:
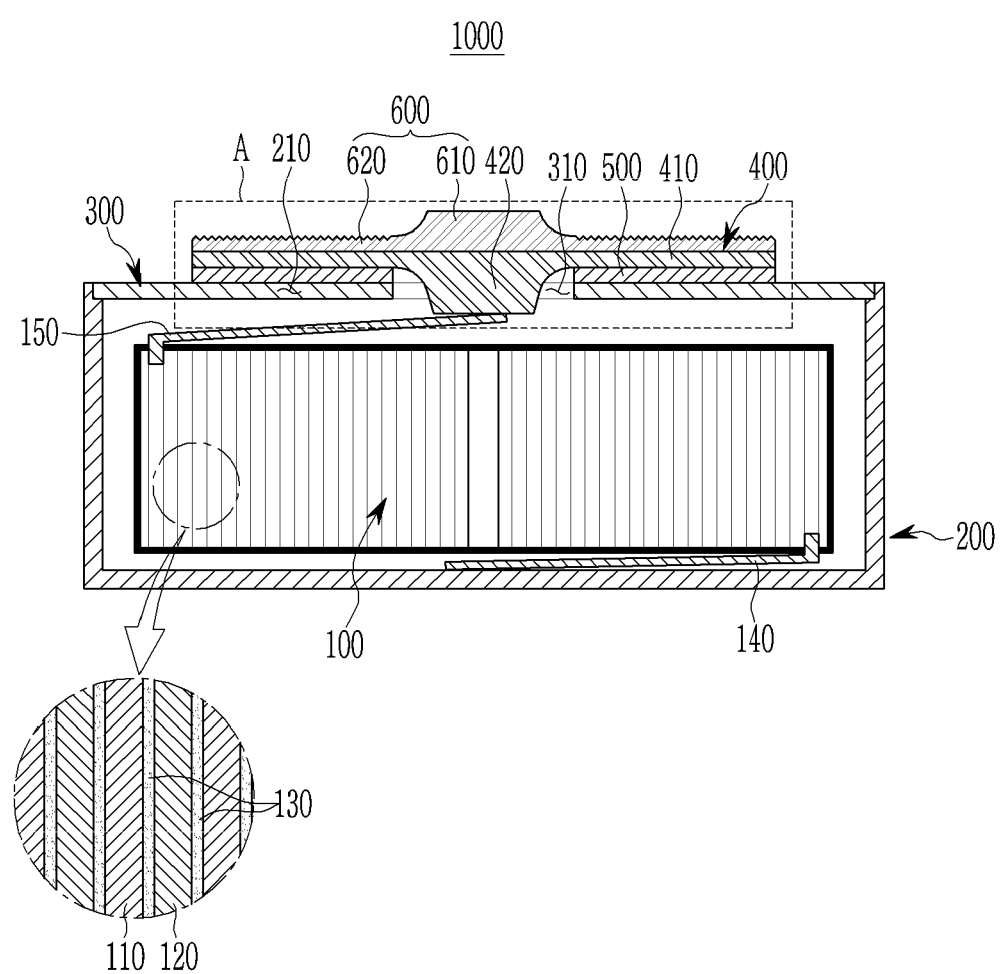
FIG. 2 is a cross-sectional view taken along the line II-II of FIG. 1.

FIG. 1 is a perspective view showing a rechargeable battery according to an embodiment; and FIG. 2 is a cross-sectional view taken along the line II-II of FIG. 1.

Referring to FIG. 1 and FIG. 2, a rechargeable battery 1000 according to an embodiment includes an electrode assembly 100, a case 200, a cap plate 300, a terminal plate 400, a thermal-fusion layer 500, and a terminal plating layer 600.

The electrode assembly 100 is accommodated in the case 200. A lower part of the electrode assembly 100 faces a lower part of the case 200, and an upper part of the electrode assembly 100 faces the cap plate 300 and the terminal plate 400 covering an opening 210 of the case 200. In an embodiment, the upper and lower parts of the electrode assembly 100 may have a planar shape parallel to each other, but are not limited thereto.

The electrode assembly 100 includes a first electrode 110, a second electrode 120, a separator 130, a first electrode tab 140, and a second electrode tab 150.

The first electrode 110 and the second electrode 120 are separated from each other, and the separator 130 including an insulating material is disposed between the first electrode 110 and the second electrode 120. In an embodiment, the first electrode 110 may be a cathode, and the second electrode 120 may be an anode, but the present invention is not limited thereto, and, in another embodiment, the first electrode 110 may be an anode and the second electrode 120 may be a cathode.

In an embodiment, the first electrode 110 has a band shape extending in a direction, and includes a cathode coated region that is an area where a cathode active material layer is coated to a current collector of a metal foil (for example, a Cu foil), and a cathode uncoated region that is an area where the active material is not coated. The cathode uncoated region may be disposed at an end in the extension direction of the first electrode 110.

In an embodiment, the second electrode 120 has a band shape that is spaced apart from the first electrode 110 with the separator 130 interposed therebetween, and extends in a direction and includes an anode coated region that is an area where an anode active material layer is applied to the current collector of a metal foil (for example, an Al foil), and an anode uncoated region that is an area where the active material is not applied. The anode uncoated region may be disposed at an end in the extending direction of the second electrode 120.

The separator 130 extends in a direction between the first electrode 110 and the second electrode 120 to prevent or substantially prevent a short circuit between the first electrode 110 and the second electrode 120.

In an embodiment, the first electrode 110, the separator 130, and the second electrode 120 are sequentially stacked and wound in a jelly roll shape, but are not limited thereto, and may be formed in any of various known shapes. Each of the first electrode 110, the second electrode 120, and the separator 130 may include any of various known materials.

The first electrode tab 140 extends from the first electrode 110 of the electrode assembly 100 to the case 200. In an embodiment, the first electrode tab 140 is combined with a lower part of the case 200 to connect the first electrode 110 and the case 200. The first electrode tab 140 is in contact with the first electrode 110 and the case 200. By the first electrode tab 140, the case 200 has a same polarity (for example, a cathode polarity) as the first electrode 110.

The second electrode tab 150 extends from the second electrode 120 of the electrode assembly 100 to the terminal plate 400. In an embodiment, the second electrode tab 150 is combined with a protruded part 420 of the terminal plate 400 to connect the second electrode 120 and the terminal plate 400. The second electrode tab 150 is in contact with the second electrode 120 and the terminal plate 400. By the second electrode tab 150, the terminal plate 400 has a same polarity as the second electrode 120 (for example, an anode polarity).

In an embodiment, a center pin penetrating the center of the electrode assembly 100 in a vertical direction is disposed in a center portion of the electrode assembly 100, and the center pin may support the first electrode tab 140 and the second electrode tab 150, but is not limited thereto.

The case 200 is connected to the first electrode 110 of the electrode assembly 100 and houses the electrode assembly 100. The case 200 includes an opening 210 that exposes the top of the electrode assembly 100. The lower part of the case 200 is connected to the first electrode 110 of the electrode assembly 100 by the first electrode tab 140, and has the same polarity (for example, the cathode polarity) as the first electrode 110. In an embodiment, the case 200 has a cylinder shape for accommodating the electrode assembly 100 in the form of the jelly roll, but is not limited thereto, and may have any of various known shapes. The case 200 can accommodate any of various known electrolyte solutions along with the electrode assembly 100. The outer surface of the case 200 may be a cathode terminal of the rechargeable battery 1000. In this case, the outer surface of the terminal plate 400 coated with the terminal plating layer 600 may be an anode terminal of the rechargeable battery 1000. In an embodiment, a plating layer may be coated on the outer surface of the case 200, but is not limited thereto, and any of various known coating layers may be coated on the outer surface of the case 200.

The opening 210 of the case 200 is covered by the cap plate 300 and the terminal plate 400.

The cap plate 300 is combined with the case 200 to cover the outer area of opening 210. The cap plate 300 includes a through-hole 310 that exposes a central area of the opening 210. In an embodiment, the cap plate 300 is directly coupled to a side wall of the case 200 forming the opening 210 of the case 200 by a welding process to cover the outer area of the opening 210. In an embodiment, the cap plate 300 has a ring shape by the through-hole 310 formed in the center, but is not limited thereto. The cap plate 300 is combined with the case 200, and has the same polarity (for example, the cathode polarity) as first electrode 110. In an embodiment, the cap plate 300 includes stainless steel, but is not limited thereto, and may include any of metals, such as aluminum, nickel, and copper.

In an embodiment, a plating layer may be coated on the outer surface of the cap plate 300, but the present invention is not limited thereto, and any of various known coating layers may be coated on the outer surface of the cap plate 300.

The terminal plate 400 is insulated and combined to the cap plate 300 to cover the through-hole 310 of the cap plate 300. The terminal plate 400 is disposed on the cap plate 300. The terminal plate 400 covers the central area of the opening 210 of the case 200 exposed by the through-hole 310 of the cap plate 300. Since the terminal plate 400 covers the central area of the opening 210 and the cap plate 300 covers the outer area of the opening 210, the opening 210 of the case 200 is completely covered by the terminal plate 400 and the cap plate 300. The terminal plate 400 is connected to the second electrode tab 150 of the electrode assembly 100 to be connected to the second electrode 120 of the electrode assembly 100. The terminal plate 400 has the same polarity (for example, the anode polarity) as the second electrode 120.

The terminal plate 400 includes a terminal part 410 and the protruded part 420.

The terminal part 410 is disposed on the cap plate 300 and overlaps the cap plate 300. The terminal part 410 has a wider area than the protruded part 420. For example, the terminal part 410 may have a larger diameter than the protruded part 420. A lower surface of the terminal part 410 is in contact with the thermal-fusion layer 500, and the terminal part 410 is insulated and combined to the cap plate 300 by the thermal-fusion layer 500.

The protruded part 420 is protruded from the terminal part 410 corresponding to the through-hole 310 of the cap plate 300, and penetrates the through-hole 310. A lower surface of the protruded part 420 is in contact with the second electrode tab 150. As the protruded part 420 is combined with the second electrode tab 150, the terminal plate 400 has the same polarity as the second electrode 120.

In an embodiment, the terminal plate 400 includes aluminum, but is not limited thereto, and may include any of metals, such as stainless steel, nickel, and copper.

The thermal-fusion layer 500 is disposed between the cap plate 300 and the terminal part 410 of the terminal plate 400, and insulates and bonds between the cap plate 300 and the terminal plate 400. The thermal-fusion layer 500 includes an insulating material, and insulates between the cap plate 300 and the terminal plate 400. In an embodiment, the thermal-fusion layer 500 is thermally fused between the cap plate 300 and the terminal part 410 of the terminal plate 400 by using heat or a laser beam. The thermal-fusion layer 500 may include any of various known materials for insulating and bonding between the cap plate 300 and the terminal plate 400. By bonding the thermal-fusion layer 500 between the cap plate 300 and the terminal plate 400, the opening 210 of the case 200 in which the electrode assembly 100 is accommodated is completely sealed by the cap plate 300, the terminal plate 400, and the thermal-fusion layer 500.

The terminal plating layer 600 is coated on an upper surface of the terminal plate 400. In an embodiment, the terminal plating layer 600 is coated only on the upper surface of the terminal part 410 of the terminal plate 400, but is not limited thereto, and, in another embodiment, may be coated on the entire surface of the terminal plate 400.

The terminal plate 400 coated with the terminal plating layer 600 forms an anode terminal having the same polarity as the second electrode 120 of the electrode assembly 100 of the rechargeable battery 1000, but is not limited thereto.

The terminal plating layer 600 includes a center portion 610 and an outer portion 620, and the center portion 610 of the terminal plating layer 600 is protruded upward from the outer portion 620. In an embodiment, the terminal plating layer 600 may be plated on the upper surface of the terminal plate 400 in the form of a plate and formed in a form including a center portion 610 and an outer portion 620 by a forging process, but is not limited thereto.

For example, the terminal plating layer 600 is plated on the upper surface of the plate-shaped terminal plate 400 in the plate form, and the outer portion of the plate-shaped terminal plate 400 plated with the plate-shaped terminal plating layer 600 is forging-processed, thereby the terminal plate 400 including the terminal part 410 and the protruded part 420 and the terminal plating layer 600 including the center portion 610 and the outer portion 620 may be concurrently (e.g., simultaneously) formed.

Figure 3:
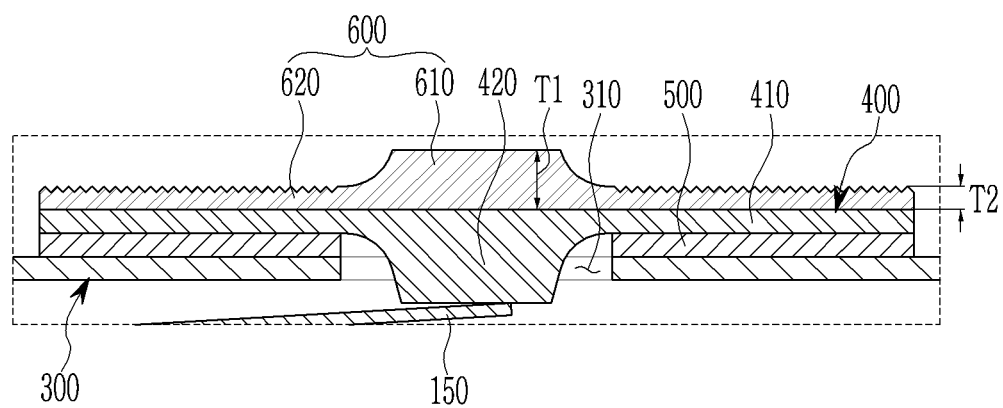
FIG. 3 is a cross-sectional view of a region "A" of FIG. 2.

FIG. 3 is a cross-sectional view showing a region "A" of FIG. 2.

Referring to FIG. 3, the center portion 610 of the terminal plating layer 600 overlaps a portion corresponding to the through-hole 310 of the cap plate 300 in a direction perpendicular to the through-hole 310, and the outer portion 620 of the terminal plating layer 600 overlaps a portion corresponding to a surface of the cap plate 300 in the direction perpendicular to the surface of the cap plate 300.

In an embodiment, a first thickness T1 of the center portion 610 of the terminal plating layer 600 is thicker than a second thickness T2 of the outer portion 620. The center portion 610 of the terminal plating layer 600 is protruded upward from the surface of the terminal plate 400 from the outer portion 620. The center portion 610 of the terminal plating layer 600 is protruded in an opposite direction to the protruded part 420 of the terminal plate 400.

As the first thickness T1 of the center portion 610 of the terminal plating layer 600 is thicker than the second thickness T2 of the outer portion 620 and the center portion 610 is protruded upward from the surface of the terminal plate 400 from the outer portion 620, since the center portion 610 of the terminal plating layer 600 that is the electrode terminal of the rechargeable battery 1000 may be in contact with a contact terminal of a device by a stronger pressure than the outer portion 620 such that the contact area between the center portion 610 of the terminal plating layer 600 and the contact terminal of the device is increased, an increase of the contact resistance between the center portion 610 of the terminal plating layer 600 that is an electrode terminal of the rechargeable battery 1000 and the contact terminal of the device may be suppressed.

In an embodiment, a surface roughness of the center portion 610 of the terminal plating layer 600 is less than a surface roughness of the outer portion 620. In an embodiment, the surface of the center portion 610 of the terminal plating layer 600 is flatter than the surface of the outer portion 620.

As the surface roughness of the center portion 610 of the terminal plating layer 600 is less than the surface roughness of the outer portion 620, the center portion 610 of the terminal plating layer 600 that is the electrode terminal of the rechargeable battery 1000 may be in contact with a contact terminal of a device with a greater area than the outer portion 620 such that the contact area between the center portion 610 of the terminal plating layer 600 and the contact terminal of the device is increased, and thereby an increase of the contact resistance between the center portion 610 of the terminal plating layer 600 that is an electrode terminal of the rechargeable battery 1000 and the contact terminal of the device may be suppressed.

In an embodiment, the terminal plating layer 600 has less ductility than the terminal plate 400. In an embodiment, the terminal plating layer 600 is more rigid than the terminal plate 400.

As the terminal plating layer 600 has less ductility than the terminal plate 400, the terminal plating layer 600 that is the electrode terminal of the rechargeable battery 1000 may be suppressed from being deformed by pressure due to the contact with a contact terminal of a device such that a reduction of the contact area between the terminal plating layer 600 and the contact terminal of the device due to deformation of the terminal plating layer 600 may be suppressed, and thereby an increase of the contact resistance between the terminal plating layer 600 that is the electrode terminal of the rechargeable battery 1000 and the contact terminal of the device may be suppressed.

In an embodiment, the terminal plating layer 600 includes nickel (Ni), and the terminal plate 400 includes aluminum (Al).

In an embodiment, as the terminal plating layer 600 includes nickel, which has higher corrosion resistance compared to aluminum contained in the terminal plate 400, since the formation of an oxide layer on the surface of the terminal plating layer 600 that is in contact with a contact terminal of a device may be suppressed, an increase in the contact resistance between the terminal plating layer 600, which is an electrode terminal of the rechargeable battery 1000 and the contact terminal of the device, may be suppressed.

As described above, in the rechargeable battery 1000 according to an embodiment, the first thickness T1 of the center portion 610 of the terminal plating layer 600 is thicker than the second thickness T2 of the outer portion 620, the surface roughness of the center portion 610 is less than the surface roughness of the outer portion 620, and the terminal plating layer 600 contains nickel (Ni) while having less ductility than the terminal plate 400, such that the center portion 610 of the terminal plating layer 600 as the electrode terminal of the rechargeable battery 1000 may be in contact with a contact terminal of a device in a large area with a strong pressure, and an increase of the contact area between the terminal plating layer 600 and the contact terminal of the device and concurrently (e.g., simultaneously) deformation of the terminal plating layer 600 by pressure due to the contact with the contact terminal of the device may be suppressed and the formation of an oxide layer on the surface of the terminal plating layer 600 may be suppressed, and thereby an increase of the contact resistance between the terminal plating layer 600 as an electrode terminal of the rechargeable battery 1000 and the contact terminal of the device may be suppressed.

That is, the rechargeable battery 1000, in which the formation of the oxide layer on the surface of the electrode terminal of the rechargeable battery 1000 is suppressed, and the contact resistance between the electrode terminal of the rechargeable battery 1000 and the contact terminal of the device is suppressed, is provided.

While the present invention has been described in connection with what are presently considered to be some example embodiments, it is to be understood that the invention is not limited to the disclosed embodiments. On the contrary, it is intended to cover various modifications and equivalent arrangements included within the spirit and scope of the appended claims.

What is claimed is:

1. A button cell comprising:
   an electrode assembly comprising a first electrode, a second electrode, and a separator between the first electrode and the second electrode;
   a case connected to the first electrode and accommodating the electrode assembly, the case comprising an opening to receive the electrode assembly;
   a cap plate bonded to the case to cover an outer region of the opening and comprising a through-hole to expose a center region of the opening;
   a terminal plate bonded to and insulated from the cap plate, covering the through-hole, and connected to the second electrode; and
   a terminal plating layer on a planar upper surface of the terminal plate,
   wherein a thickness of a center portion of the terminal plating layer overlapping the through-hole is thicker than a thickness of an outer portion of the terminal plating layer overlapping the planar upper surface of the terminal plate.

2. A button cell comprising:
   an electrode assembly comprising a first electrode, a second electrode, and a separator between the first electrode and the second electrode;

a case connected to the first electrode and accommodating the electrode assembly, the case comprising an opening to receive the electrode assembly;

a cap plate bonded to the case to cover an outer region of the opening and comprising a through-hole to expose a center region of the opening;

a terminal plate bonded to and insulated from the cap plate, covering the through-hole, and connected to the second electrode; and a terminal plating layer on an upper surface of the terminal plate, wherein a thickness of a center portion of the terminal plating layer overlapping the through-hole is thicker than a thickness of an outer portion of the terminal plating layer overlapping the upper surface of the terminal plate, and wherein a surface roughness of the center portion of the terminal plating layer is less than a surface roughness of the outer portion of the terminal plating layer.

3. The button cell of claim 1, wherein the terminal plating layer has a ductility less than that of the terminal plate.

4. The button cell of claim 1, wherein the center portion of the terminal plating layer is protruded in an upper direction from the outer portion of the terminal plating layer.

5. The button cell of claim 1, wherein
the terminal plate comprises aluminum, and
the terminal plating layer comprises nickel.

6. The button cell of claim 5, wherein the case and the cap plate comprise stainless steel.

7. The button cell of claim 1, wherein the terminal plate comprises:
a terminal part on the cap plate; and
a protruded part penetrating through the through-hole from the terminal part to be connected to the second electrode.

8. The button cell of claim 7, wherein the terminal plating layer is on an upper surface of the terminal part.

9. The button cell of claim 8, wherein the center portion of the terminal plating layer is protruded in an opposite direction to the protruded part.

10. The button cell of claim 1, wherein
the case and the cap plate have a same polarity as the first electrode, and
the terminal plate and the terminal plating layer have a same polarity as the second electrode.

11. The button cell of claim 1, further comprising a thermal-fusion layer between the cap plate and the terminal plate to insulate and bond the cap plate and the terminal plate.

12. The button cell of claim 1, wherein the electrode assembly further comprises:
a first electrode tab extending from the first electrode to be bonded to the case; and
a second electrode tab extending from the second electrode to be bonded to the terminal plate.

* * * * *